(12) United States Patent
Chung et al.

(10) Patent No.: US 10,699,693 B1
(45) Date of Patent: Jun. 30, 2020

(54) SOUND GENERATOR FOR VEHICLE

(71) Applicants: HYUNDAI MOTOR COMPANY, Seoul (KR); KIA MOTORS CORPORATION, Seoul (KR)

(72) Inventors: Hyong Do Chung, Anyang-si (KR); Jung Wu Jung, Suwon-si (KR); Sang Jun Ahn, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/505,247

(22) Filed: Jul. 8, 2019

(51) Int. Cl.
*G10K 15/02* (2006.01)
*H04R 1/02* (2006.01)
(Continued)

(52) U.S. Cl.
CPC .............. *G10K 15/02* (2013.01); *H04R 1/025* (2013.01); *H04R 3/00* (2013.01); *H04R 9/025* (2013.01); *H04R 9/06* (2013.01); *B60Q 5/00* (2013.01); *B60Y 2306/11* (2013.01); *H04R 2499/13* (2013.01)

(58) Field of Classification Search
CPC ........ G10K 11/22; G10K 11/172; G10K 9/04; G10K 11/002; G10K 11/16; G10K 11/025; G10K 11/04; G10K 11/08; G10K 11/161; G10K 11/178; G10K 2210/1082; G10K 2210/109; G10K 2210/112; G10K 2010/121; G10K 2210/125; G10K 2010/1281; G10K 2210/3212; G10K 2210/3219; G10K 2010/3227; G10K 2210/32271; G10K 2210/32272; G10K 2210/3229; G10K 9/13; H04R 1/2811; H04R 1/021; H04R 1/025; H04R 1/2842; H04R 2201/003; H04R 2499/15; H04R 17/00; H04R 1/2819; H04R 1/2826; H04R 1/2857; H04R 1/2865; H04R 1/403; H04R 2499/11; H04R 3/04; H04R 19/005; H04R 19/04; H04R 1/02; H04R 1/227; H04R 1/2838; H04R 1/2849; H04R 1/2853; H04R 1/2869; H04R 1/2888; H04R 1/2896; H04R 1/30; H04R 1/323; H04R 1/44; H04R 2209/027; H04R 27/00; H04R 29/005; H04R 3/002; H04R 3/005; H04R 9/025; H04R 9/06; H04R 1/08; H04R 1/22;
(Continued)

(56) References Cited

U.S. PATENT DOCUMENTS 5,571,239 A * 11/1996 Kameda ................. F01N 1/065
 123/184.21
9,025,786 B2 * 5/2015 Luecking ............... F01N 1/065
 381/56
(Continued)

*Primary Examiner* — Lun-See Lao
(74) *Attorney, Agent, or Firm* — Morgan, Lewis & Bockius LLP

(57) ABSTRACT

A sound generator for a vehicle includes: a resonator chamber configured to contact and expand in a longitudinal direction; a membrane disposed on a front open part of the resonator chamber; a cover disposed on a rear open part of the resonator chamber; a connecting pipe connected between the cover and an engine intake system; a magnet disposed on an inner surface of the cover; a coil disposed in a front end part of the resonator chamber; and a sound controller configured to apply an electric current to the coil.

10 Claims, 5 Drawing Sheets

(51) Int. Cl.
   *H04R 9/06*    (2006.01)
   *H04R 3/00*    (2006.01)
   *H04R 9/02*    (2006.01)
   *B60Q 5/00*    (2006.01)

(58) Field of Classification Search
   CPC .... H04R 1/2834; H04R 1/46; H04R 2499/13; G10D 3/02
   USPC ............ 381/86, 71.1–71.9, 94; 181/206, 309
   See application file for complete search history.

(56) References Cited

U.S. PATENT DOCUMENTS

| | | | |
|---|---|---|---|
| 9,374,632 B2 * | 6/2016 | Krueger | F02M 35/125 |
| 2003/0152239 A1 * | 8/2003 | Graefenstein | G10K 11/178 |
| | | | 381/71.5 |
| 2014/0328493 A1 * | 11/2014 | Wirth | H04R 1/028 |
| | | | 381/86 |
| 2014/0334633 A1 * | 11/2014 | Krueger | F02M 35/125 |
| | | | 381/71.4 |

* cited by examiner

[FIG.1]
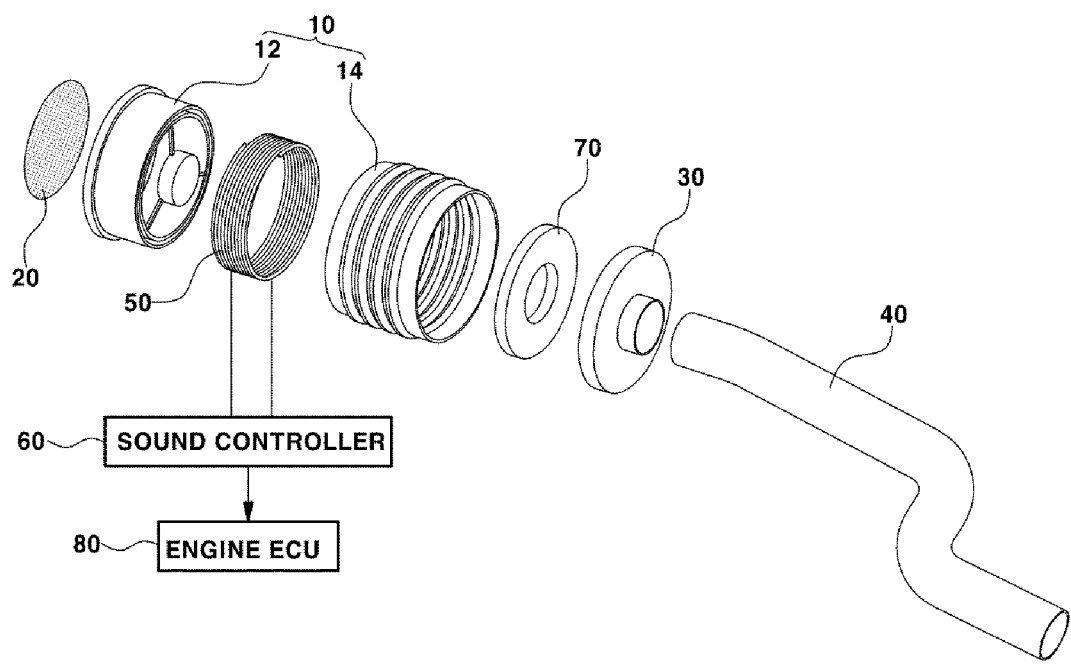

[FIG.2]
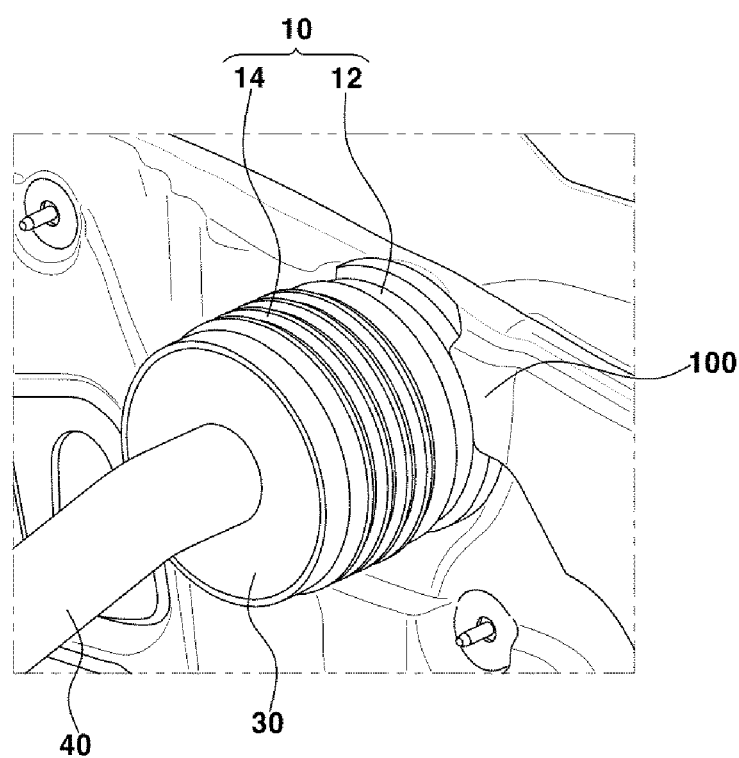

[FIG.3]
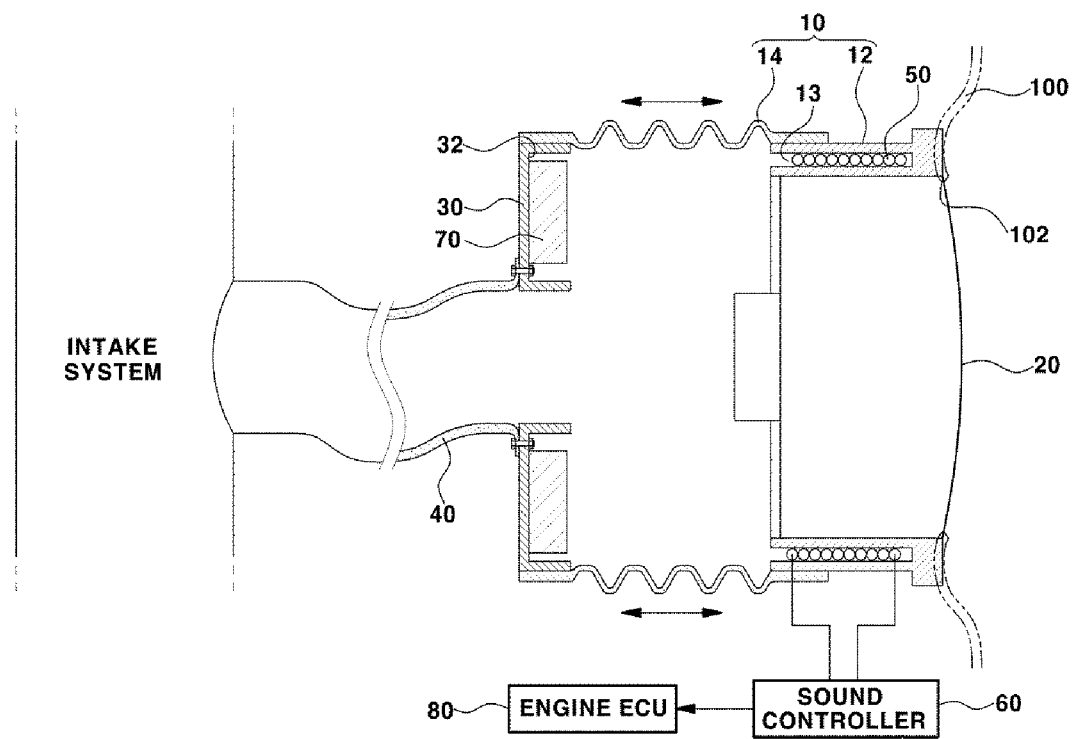

[FIG.4]
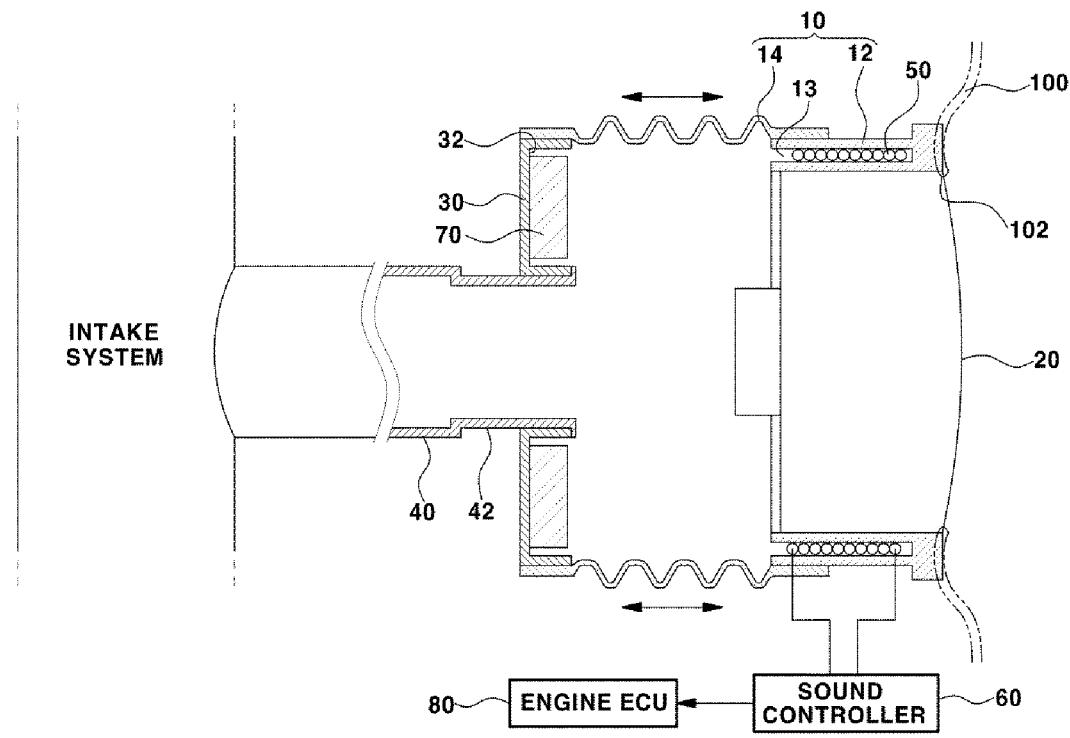
[FIG.5A]
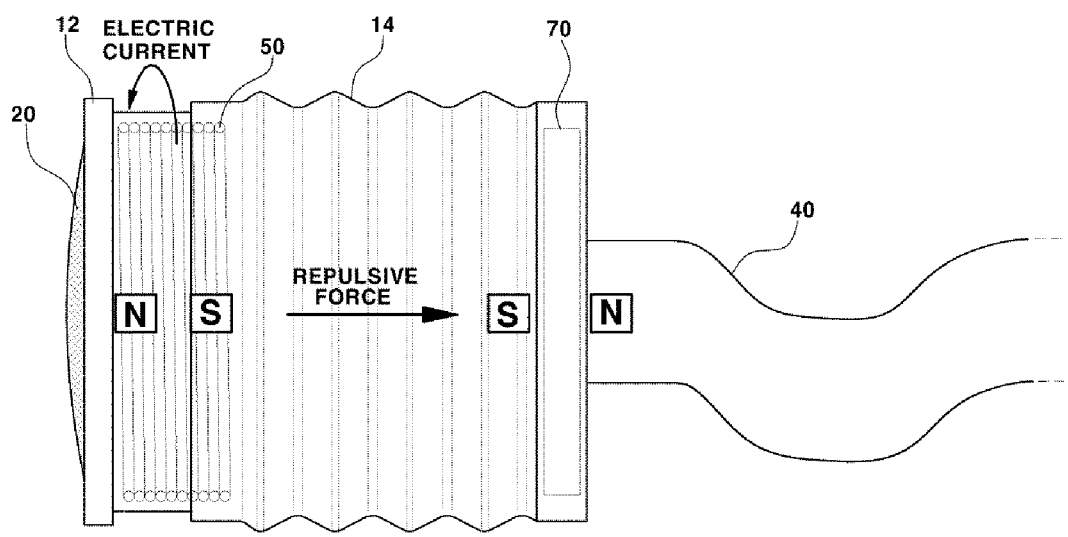

[FIG.5B]
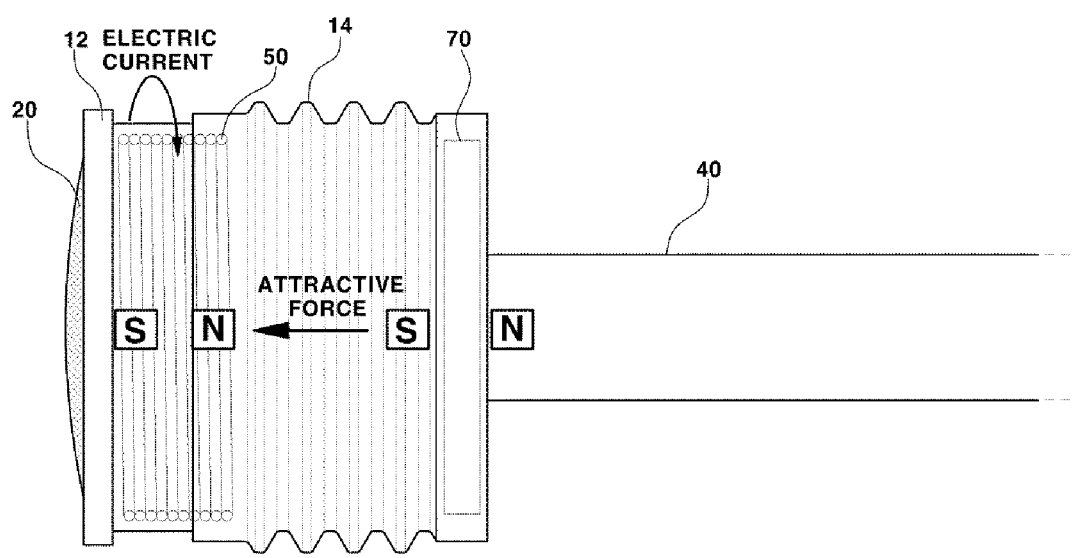

SOUND GENERATOR FOR VEHICLE

CROSS REFERENCE TO RELATED APPLICATION

The present application claims priority to Korean Patent Application No. 10-2019-0038009 filed Apr. 1, 2019 in the Korean Intellectual Property Office, the entire contents of which is incorporated herein for all purposes by this reference.

TECHNICAL FIELD

The present disclosure relates generally to a sound generator for a vehicle, and more particularly, to an active sound generator for a vehicle capable of tuning a frequency of an engine sound using a resonator and a membrane.

BACKGROUND

In the past, techniques for reducing engine noise flowing into a cabin of a vehicle for quietness of driving of the vehicle were mainly applied. However, in the recent years, techniques for amplifying engine sounds in various types are implemented in order to realize dynamic and sporty driving sound to be heard inside the vehicle.

The sound amplifying ways may be divided into three types: a membrane sound generator type; an electric sound generator type; and an active sound generator type.

The membrane sound generator type is configured such that a membrane is mounted on a dash panel, that is, a partition member separating an engine room from the cabin of the vehicle, and a pipe is connected between an engine intake side and the membrane so that engine discharge sound is directly transmitted to the cabin of the vehicle through the membrane. The membrane sound generator type has an advantage of realizing a natural tone by transmitting the engine discharge sound directly to the cabin of the vehicle; however, it cannot tune the engine discharge sound to desired frequency, and thus cannot realize a desired sound.

The electric sound generator type is configured so that when a dash panel becomes excited using a separate actuator, sound due to the excitation is transmitted to the cabin of the vehicle. The electric sound generator has an advantage of being capable of tuning the engine discharge sound to a desired frequency band, but rattle noise occurs and durability of the dash panel is decreased according to direct excitation of dash panel.

The active sound generator type is configured to arbitrarily generate sound such as the engine sound from a speaker inside the vehicle. The active sound generator type has an advantage of being capable of tuning the engine discharge sound to the desired frequency band. However, it is difficult for a user to feel the sound because the active sound generator type does not have vibration such as in the case of electric sound generator type, and feel a sense of difference from natural tone as the sound gives the user artificial sensibility rather than natural tone.

SUMMARY

The present disclosure has been made keeping in mind the above problems occurring in the related art, and the present disclosure is intended to propose an active sound generator for a vehicle, the sound generator adopts a membrane sound generator type capable of realizing the most natural tone, and is capable of realizing a desired sound by tuning engine discharge sound to desired frequency using a resonator.

In order to achieve the above object, according to one aspect of the present disclosure, an active sound generator for a vehicle includes: a resonator chamber configured to contact and expand in a longitudinal direction; a membrane disposed on a front open part of the resonator chamber; a cover disposed on a rear open part of the resonator chamber; a connecting pipe connected between the cover and an engine intake system; a magnet disposed on an inner surface of the cover; a coil disposed in a front end part of the resonator chamber; a sound controller for applying an electric current to the coil.

The resonator chamber may include: a hollow chamber mounted on a dash panel; and a bellows tube having a front end part connected to the hollow chamber and a rear end part connected to the cover.

An inner surface of the hollow chamber may have a coil engaging groove into which the coil is inserted.

The membrane may be mounted on a front open part of the hollow chamber, and disposed in a sound wave transmission hole provided in the dash panel.

An inner surface of the cover may have a magnet engaging groove into which the magnet is inserted.

The connecting pipe may be made of a rubber material and connected between the cover and the engine intake hole while having a predetermined deflection amount.

The connecting pipe may be made of a metal material, and a front end part thereof connected to the cover may have a sliding guide part having a longer length in comparison with a thickness of the cover.

An inner diameter part of the cover may be fitted over the sliding guide part of the connecting pipe, so that when the resonator chamber contracts or expands, the cover may be moved along a length section of the sliding guide part.

The sound generator may further include: an engine electronic control unit (ECU) for transmitting an engine RPM signal to the sound controller.

The sound controller may variably control a voltage applied to the coil according to engine RPM so as to amplify sound pressure of frequency of engine sound which varies depending on the engine RPM.

Through the technical solution described above, the present disclosure provides the following effects.

First, the sound generator according to the exemplary embodiments of the present disclosure can realize the desired sound by tuning the engine discharge sound to the desired frequency using the resonator, etc., unlike the conventional membrane sound generator type.

Second, as the sound generator according to the exemplary embodiments of the present disclosure adopts the membrane sound generator type, the sound generator can tune the engine sound to the sound of the desired frequency band, in addition to realizing the engine sound as the most natural tone, unlike the conventional electric sound generator type and active sound generator type that generate an artificial sound.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is an exploded-perspective view showing a sound generator for a vehicle according to the present disclosure.

FIG. 2 is a perspective view showing appearance of the mounted sound generator for the vehicle according to the present disclosure.

FIG. 3 is a cross-sectional view showing the sound generator for the vehicle according to an exemplary embodiment of the present disclosure.

FIG. 4 is a cross-sectional view showing the sound generator for the vehicle according to another exemplary embodiment of the present disclosure.

FIGS. 5A and 5B are views showing operating states of the sound generator for the vehicle according to the present disclosure.

DETAILED DESCRIPTION

Hereinbelow, exemplary embodiments of the present disclosure will be described in detail with reference to the accompanying drawings.

FIG. 1 is an exploded-perspective view showing a sound generator for a vehicle according to the present disclosure. FIG. 2 is a perspective view showing appearance of the mounted sound generator for the vehicle according to the present disclosure. FIG. 3 is a cross-sectional view showing the sound generator for the vehicle according to an exemplary embodiment of the present disclosure.

According to the present disclosure, a resonator chamber is provided with a structure capable of contracting and expanding in a longitudinal direction.

The resonator chamber 10 may include a hollow chamber 12 mounted on a dash panel 100 and a bellows tube 14 fastened to the hollow chamber 12 to be expandable and contractible.

A whole inside volume of the resonator chamber 10 is decreased when the bellows tube 14 contracts, and is increased when the bellows tube 14 expands.

In addition, a membrane 20 is mounted on a front open part of the resonator chamber 10, and a cover 30 having a hole is mounted on a rear open part thereof.

More particularly, the membrane 20 can be mounted on a front open part of the hollow chamber 12 provided in the resonator chamber 10, and the cover 30 can be mounted on a rear open part of the bellows tube 14 provided in the resonator chamber 10.

In addition, when a front end part of the hollow chamber 12 is mounted on the dash panel 100, the membrane 20 mounted on the front open part of the hollow chamber 12 is disposed in a sound wave transmission hole 102 provided in the dash panel 100.

For reference, the membrane 20 is a thin plate that is also applied to general speakers and functions to transmit a sound wave to the outside while performing vibration movement due to difference in sound pressure.

A connecting pipe 40 may be connected between the cover 30 and an engine intake system (for example, an intake pipe).

According to an exemplary embodiment of the present disclosure, as shown in FIG. 3, the connecting pipe 40 may be made of a rubber pipe capable of expanding and contracting and may be connected between the cover 30 and the engine intake system while having a predetermined deflection amount.

Accordingly, when the bellows tube 14 expands or contracts, the cover 30 connected between the bellows tube 14 and the connecting pipe 40 maybe easily moved in expanding and contracting directions with the bellows tube 14.

On the other hand, when the connecting pipe 40 is made of a metal pipe, the connecting pipe 40 may not stretch in the longitudinal direction unlike when using the rubber pipe, so that the cover 30 may not be moved in the expanding and contracting directions together when the bellows tube 14 expands and contracts. Accordingly, expansion and contraction movements of the bellows tube 14 may be impossible.

According to another exemplary embodiment of the present disclosure, when the connecting pipe 40 is made of the metal pipe as shown in FIG. 4, the front end part of the connecting pipe 40 connected to the cover 30 includes a sliding guide part 42 that has a longer length in comparison with thickness of the cover 30.

Here, an inside diameter part of the cover 30 is fitted over the sliding guide part 42 of the connecting pipe 40, so that when the bellows tube 14 of the resonator chamber 10 expands and contracts, the cover 30 is moved along a length section of the sliding guide part 42, whereby the expansion and contraction movements of the bellows tube 14 may be possible.

Generally, a resonator includes a volume body having a specific capacity such as a plastic bottle and a neck provided in an opening of the volume body. The resonator is mainly used to reduce sound of a specific frequency band by using a resonance effect of sound, and the resonator frequency band is determined by a volume of the volume body and a diameter and length of the neck.

For reference, sound pressure (dB) of the specific frequency is generated at a high level in the resonator, when the membrane is mounted on one surface of the resonator, a sound amplification effect such as sound wave of a corresponding frequency band to be intensively transmitted to the outside through the membrane may be obtained.

Accordingly, the resonator chamber 10 formed of the hollow chamber 12 and the bellows tube 14 functions as the resonator, and the membrane 20 mounted on the front end part of the hollow chamber 12 performs a function of sound amplification that allows the sound wave of the specific frequency band to be transmitted to the outside.

Accordingly, as an engine sound flowing through the connecting pipe 40 acts on the membrane 20 through the bellows tube 14 and the hollow chamber 12 which function as the resonator, the engine sound may be transmitted to the cabin of the vehicle through the membrane 20.

An inner surface of the hollow chamber 12 providing the resonator chamber 10 includes a coil engaging groove 13 into which a coil 50 is inserted.

The coil 50 wound in a circle at least several or dozens of times may be inserted into the coil engaging groove 13.

A sound controller 60 for applying an electric current and a voltage is connected to the coil 50 to enable conduction.

As an engine electronic control unit (an engine (ECU, 80) for transmitting an engine RPM signal may be connected to the sound controller 60, the sound controller 60 can receive the engine RPM signal of the engine ECU 80 and variably can control a voltage applied to the coil 50 according to engine RPM so that the sound pressure of the engine frequency which varies depending on the engine RPM may be amplified.

In addition, an inner surface of the cover 30 is provided with a magnet engaging groove 32 into which a magnet 70 is inserted, and the permanent magnet 70 formed into a ring shape is inserted in the magnet engaging groove 32.

Depending on the direction of the electric current applied to the coil 50, the magnet 70 exerts a repulsive force to move away from the coil 50 or an attractive force to be attached to the coil 50.

According to the present disclosure having the structure described above, an operation flow of the sound generator for the vehicle will be described as follows.

FIGS. 5A and 5B are views showing operating states of the sound generator for the vehicle according to the present disclosure.

When the engine ECU 80 transmits an engine RPM signal to the sound controller 60, the sound controller 60 varies a voltage applied to the coil 50 depending on the engine RPM in consideration of a point that frequency of engine C2 component varies depending on engine RPM.

TABLE 1

| Engine RPM | 2000 | 2000 | 3000 | 4000 | 5000 |
|---|---|---|---|---|---|
| C2 frequency (Hz) | 33 | 66 | 100 | 133 | 166 |

For reference, the frequency of engine C2 component (C2 frequency) is a sign expressed by C2 of which a vibration component when basic vibration frequency of an engine is expanded to twice the number of crankshaft revolutions. For an arbitrary n-cylindered engine, C2 frequency may be expressed as a vibration component having frequency of n/2 of the crankshaft revolution number.

For example, at 2700 engine RPM, when C2 frequency is 90 Hz that is a lower value than a reference value, the sound controller 60 applies the electric current that will be applied to the coil 50, in a first direction as shown in FIG. 5A. Thus, a magnetic field is generated in the coil 50 and a front and rear ends of the coil 50 have N and S poles, respectively. Therefore, the coil exerts the repulsive force pushing the magnet 70 with an S pole and N pole arrangement.

As the cover 30 in which the magnet 70 is inserted is moved backward, the bellows tube 14 connected to the cover 30 expands, and volume inside the resonator chamber 10 is increased. Accordingly, the engine sound flowing through the connecting pipe 40 into the resonator chamber 10 may be amplified.

Therefore, as the volume inside the resonator chamber 10 is increased, low-frequency engine sound (for example, 90 Hz C2 frequency at 2700 engine RPM) flowing through the connecting pipe 40 into the resonator chamber 10 is tuned to be amplified in the resonator chamber 10 and acts on the membrane 20. Thus, the tuned engine sound may be transmitted to the cabin of the vehicle through the membrane 20.

On the other hand, at 6030 engine RPM, when C2 frequency is 201 Hz which is a higher value than the reference value, the sound controller 60 applies the electric current that will be applied to the coil 50, in a second direction as shown in FIG. 5B. Thus, a magnetic field is generated in the coil 50 and a front and rear ends of the coil 50 have S and N poles, respectively. Therefore, the coil 50 exerts the attractive force for pulling the magnet 70 having the S and N poles.

In addition, as the cover 30 in which the magnet 70 is inserted is moved forward and the bellows tube 14 connected to the cover 30 contracts, the volume inside the resonator chamber 10 is decreased by a predetermined level.

Accordingly, since the engine sound flowing through the connecting pipe 40 into the resonator chamber 10 is high-frequency that is equal to or higher than a predetermined level (for example, 201 Hz C2 frequency at 6030 engine RPM), even when the volume inside the resonator chamber 10 is decreased by the predetermined level, as the engine sound is tuned to be amplified in the resonator chamber 10 and acts on the membrane 20, the engine sound tuned through the membrane 20 may be transmitted to the cabin of the vehicle.

Thus, by tuning the frequency of the engine sound to a desired level and transmitting it to the cabin of the vehicle, the engine sound can be realized as the most natural tone and transmitted to the cabin of the vehicle.

What is claimed is:

1. A sound generator for a vehicle comprising:
   A resonator chamber configured to contact and expand in a longitudinal direction;
   a membrane disposed on a front open part of the resonator chamber;
   a cover disposed on a rear open part of the resonator chamber;
   a connecting pipe connected between the cover and an engine intake system;
   a magnet disposed on an inner surface of the cover;
   a coil disposed in a front end part of the resonator chamber; and
   a sound controller configured to apply an electric current to the coil.

2. The sound generator of claim 1, wherein the resonator chamber includes:
   a hollow chamber disposed on a dash panel; and
   a bellows tube having a front end part connected to the hollow chamber and a rear end part connected to the cover.

3. The sound generator of claim 2, wherein an inner surface of the hollow chamber has a coil engaging groove into which the coil is inserted.

4. The sound generator of claim 2, wherein the membrane is disposed on a front open part of the hollow chamber, and disposed in a sound wave transmission hole provided in the dash panel.

5. The sound generator of claim 1, wherein an inner surface of the cover has a magnet engaging groove into which the magnet is inserted.

6. The sound generator of claim 1, wherein the connecting pipe is made of a rubber material having a predetermined deflection amount and is connected between the cover and the engine intake hole.

7. The sound generator of claim 1, wherein the connecting pipe is made of a metal material, and
   wherein a front end part of the connecting pipe connected to the cover has a sliding guide part having a length longer than a thickness of the cover.

8. The sound generator of claim 7, wherein an inner diameter part of the cover is fitted into the sliding guide part of the connecting pipe, so that when the resonator chamber contracts or expands, the cover moves in a length direction of the sliding guide part.

9. The sound generator of claim 1, further comprising:
   an engine electronic control unit (ECU) configured to transmit an engine RPM signal to the sound controller.

10. The sound generator of claim 9, wherein the sound controller variably controls a voltage applied to the coil according to an engine revolutions per minute (RPM) so as to amplify a sound pressure of frequency of an engine sound which varies depending on the engine RPM.

* * * * *